(12) United States Patent
Naguib Sant et al.

(10) Patent No.: US 8,597,538 B2
(45) Date of Patent: Dec. 3, 2013

(54) COMPOSITION FOR IMPROVING DRYNESS DURING WIRE SAWING

(75) Inventors: Nevin Naguib Sant, Aurora, IL (US); Steven Grumbine, Aurora, IL (US); Kevin Moeggenborg, Naperville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 69 days.

(21) Appl. No.: 13/133,857

(22) PCT Filed: Dec. 21, 2009

(86) PCT No.: PCT/US2009/068909
§ 371 (c)(1),
(2), (4) Date: Jun. 9, 2011

(87) PCT Pub. No.: WO2010/071870
PCT Pub. Date: Jun. 24, 2010

(65) Prior Publication Data
US 2011/0239836 A1    Oct. 6, 2011

Related U.S. Application Data

(60) Provisional application No. 61/203,146, filed on Dec. 20, 2008.

(51) Int. Cl.
*C09K 5/00* (2006.01)

(52) U.S. Cl.
USPC .................................. 252/75; 252/73; 252/74

(58) Field of Classification Search
None
See application file for complete search history.

(56) References Cited

U.S. PATENT DOCUMENTS 4,468,339 A * 8/1984 Rysek et al. .................... 252/75

* cited by examiner

*Primary Examiner* — Necholus Ogden, Jr.
(74) *Attorney, Agent, or Firm* — Thomas E. Omholt; Steven D. Weseman

(57) ABSTRACT

The invention provides a composition for slicing a substrate using a wire saw wherein the composition comprises a liquid carrier and an abrasive. The invention further provides methods of slicing a substrate using a wire saw and a composition.

6 Claims, No Drawings

COMPOSITION FOR IMPROVING DRYNESS DURING WIRE SAWING

CROSS-REFERENCE TO RELATED APPLICATIONS

This application claims the benefit of U.S. Provisional Application for Patent Ser. No. 61/203,146, filed on Dec. 20, 2008, which is incorporated herein by reference.

BACKGROUND OF THE INVENTION

Wafers used in electronic devices are typically prepared from an ingot that is first sliced into thin wafers. Wire sawing is the most common method for manufacturing such wafers. A wire saw comprises a web of fine wires arranged using a series of spools and pulleys such that the wires are parallel to each other at distances of about 0.1 mm to about 1.5 mm. As a substrate is pressed against the web of wires, a composition is continuously supplied to the area. The composition generally contains an abrasive suspended in a liquid carrier which facilitates the interaction between the wire of the wire saw and the substrate wherein the substrate is abraded and sliced into wafers.

Current methods of slicing substrates to produce wafers often employ the use of non-aqueous liquid carriers in the composition containing the abrasive. Typical carriers include the use of mineral oil, kerosene, polyethylene glycol, and polyalkylene glycols. The viscous nature of these carriers allows the abrasive particles to be suspended in the composition and allows the composition to adhere to the wire of the wire saw and/or the substrate which results in a more efficient mechanical abrasion of the substrate. Such compositions, however, generally contain high concentrations of abrasive, and, due to their lack of colloidal stability, the abrasive particles settle out of solution. Non-aqueous compositions are also relatively sensitive to contamination by the materials abraded during the slicing process, which causes the abrasive particles to lose slicing efficiency and to agglomerate. In addition, due to poor thermal properties, non-aqueous compositions generally result in increased amounts of heat being generated by the wire sawing process due to friction, which in turn increases the level of wear on the wire and decreases the slicing rate. Reducing the level of wear on the wire enables the use of wires having smaller diameters, which is desirable because it reduces the amount of substrate lost during slicing (i.e., the kerf). Compositions having a longer shelf life which can increase slicing performance are desired.

During wire sawing operations, the wire moves at a relatively high velocity, which causes the composition to evaporate or dry during the slicing process, resulting in the formation of hard deposits on the wire and increasing the level of wear on the wire. This is especially problematic with respect to aqueous compositions. In addition, evaporation or drying of the composition during wire sawing operations can reduce recovery and recycling efficiency of the various components of the composition, such as the abrasive.

BRIEF SUMMARY OF THE INVENTION

The invention provides a composition for slicing a substrate using a wire saw comprising (i) a liquid carrier comprising at least about 50 wt. % water and about 0.1 wt. % to about 20 wt. % of a polyol, (ii) about 30 wt. % to about 60 wt. % of an abrasive suspended in the liquid carrier, and (iii) about 0.2 wt. % to about 10 wt. % of a thickener.

The invention also provides a composition for slicing a substrate using a wire saw comprising (i) a liquid carrier comprising at least about 50 wt. % water and about 0.1 wt. % to about 20 wt. % of a monatomic alcohol, (ii) about 30 wt. % to about 60 wt. % of an abrasive suspended in the liquid carrier, and (iii) a salt selected from the group consisting of calcium chloride, ammonium sulfate, aluminum nitrate, and combinations thereof.

The invention further provides a method of slicing a substrate, which method comprises (i) contacting the substrate with either of the compositions described above, (ii) contacting the substrate and the composition with a wire saw, and (iii) moving the wire saw, with the composition in contact therewith, relative to the substrate so as to abrade at least a portion of the substrate to slice the substrate.

DETAILED DESCRIPTION OF THE INVENTION

The invention provides a composition for slicing a substrate using a wire saw and a method of slicing a substrate using a wire saw.

The substrate to be sliced can be any suitable substrate. Suitable substrates can be, for example, silicon, sapphire, silicon carbide, germanium, gallium, or ceramics. Preferably, the substrate is silicon.

The composition comprises a liquid carrier and an abrasive suspended in the liquid carrier.

A liquid carrier is used to facilitate the application of the abrasive and any optional additives to the surface of a suitable substrate to be sliced. The liquid carrier can be any suitable solvent including lower alcohols (e.g., $C_1$-$C_6$ alcohols such as methanol, ethanol, etc.), ethers (e.g., dioxane, tetrahydrofuran, etc.), water, oil (e.g., mineral oil), kerosene, polyglycol, polyethylene glycol, polyalkylene glycols (e.g., polypropylene glycol), and mixtures thereof. Preferably, the liquid carrier comprises, consists essentially of, or consists of a mixture of water and alcohol. Without wishing to be bound by any particular theory, it is likely that the use of a non-aqueous liquid carrier increases the viscosity of the composition which increases the ability of the composition to adhere to the wire saw and/or substrate, resulting in a more efficient abrasion of the substrate. The ionic properties of the non-aqueous liquid carrier, however, also increase the colloidal instability of the composition. The materials that are abraded during the slicing process agglomerate with the abrasive particles suspended in the liquid carrier, which causes the abrasive particles to lose slicing efficiency and settle out. In addition, the use of a non-aqueous liquid carrier having poor thermal properties increases the amount of heat generated due to friction during the slicing of the substrate. The liquid carrier can comprise at least about 50 wt. % (based on the weight of the liquid carrier) water (e.g., at least about 60 wt. %, at least about 70 wt. %, at least about 80 wt. %, at least about 85 wt. %, or at least about 90 wt. % water). Alternatively, or in addition, the liquid carrier can comprise about 98 wt. % or less water (e.g., about 95 wt. % or less, about 90 wt. % or less, about 80 wt. % or less, about 70 wt. % or less, or about 60 wt. % or less water). Thus, the liquid carrier can comprise an amount of water bounded by any two of the above endpoints. For example, the liquid carrier can comprise about 50 wt. % water to about 98 wt. % water (e.g., about 50 wt. % to about 95 wt. % water, about 60 wt. % to about 95 wt. % water, or about 70 wt. % to about 95 wt. % water).

The alcohol comprising the liquid carrier can be any suitable alcohol. Preferably, the alcohol is a polyol or a monatomic alcohol. The polyol or monatomic alcohol can have a carbon chain of four or more carbons and/or a carbon ato$_m$ t$_o$ oxygen atom ratio of at least about 2.5:1. For example, the polyol can be a glycol (i.e., a diol), glycerol, polyethylene glycol (PEG), polypropylene glycol (PPG), 1,6-hexanediol, pentaerythrite, or combinations thereof. The monatomic alcohol can be, for example, 1-hexanol (hexyl alcohol), 1-octanol, 2-ethyl hexanol, or 2-butyl-1-octanol. The liquid carrier can comprise at least about 0.1 wt. % (based on the weight of the liquid carrier) alcohol (e.g., at least about 0.2 wt. %, at least about 0.5 wt. %, at least about 1 wt. %, at least about 3 wt. %, at least about 5 wt. %, at least about 7 wt. %, at least about 10 wt. %, at least about 15 wt. %, or at least about 20 wt. % alcohol). Alternatively, or in addition, the liquid carrier can comprise about 25 wt. % or less alcohol (e.g., about 20 wt. % or less, about 17 wt. % or less, about 15 wt. % or less, about 12 wt. % or less, about 10 wt. % or less, about 8 wt. % or less, about 5 wt. % or less, about 3 wt. % or less, or about 1 wt. % or less alcohol). Thus, the liquid carrier can comprise an amount of alcohol bounded by any two of the above endpoints. For example, the liquid carrier can comprise about 0.1 wt. % alcohol to about 25 wt. % alcohol (e.g., about 0.1 wt. % to about 20 wt. % alcohol, about 0.1 wt. % to about 10 wt. % alcohol, about 1 wt. % to about 15 wt. % alcohol, or about 1 wt. % to about 10 wt. % alcohol).

The abrasive typically is in particulate form (e.g., abrasive particles) and is suspended in the liquid carrier. The abrasive can be any suitable abrasive. For example, the abrasive can be natural or synthetic, and can comprise, consist essentially of, or consist of oxide, carbide, nitride, carborundum, or the like. The abrasive also can be a polymer particle or a coated particle. Preferably, the abrasive has a Mohs hardness of at least about 7.5. The abrasive typically comprises metal oxide particles. Preferably, the abrasive is selected from the group consisting of silicon carbide, diamond, boron carbide, alumina, and combinations thereof. Preferably, the abrasive is silicon carbide.

The abrasive particles typically have an average particle size (e.g., average particle diameter) of about 0.5 microns to about 100 microns. The abrasive particles can have an average particle size of at least about 0.1 microns (e.g., at least about 0.5 microns, at least about 1 micron, at least about 5 microns, at least about 10 microns, at least about 20 microns, or at least about 50 microns). Alternatively, or in addition, the abrasive particles can have an average particle size of about 500 microns or less (e.g., about 300 microns or less, about 100 microns or less, about 50 microns or less, about 30 microns or less, about 20 microns or less, about 10 microns or less, or about 8 microns or less). Thus, the abrasive can have a particle size bounded by any two of the above endpoints. For example, the abrasive particles have an average particle size of about 1 micron to about 100 microns (e.g., about 3 microns to about 50 microns, 6 microns to about 20 microns, 8 microns to about 20 microns, or 5 microns to about 15 microns). Any suitable amount of abrasive can be present in the composition.

The composition can comprise about 30 wt. % or more (e.g., about 40 wt. % or more, or about 50 wt. % or more) abrasive. Alternatively, or in addition, the composition can comprise about 90 wt. % or less of the abrasive (e.g., about 75 wt. % or less, about 60 wt. % or less, about 50 wt. % or less, or about 40 wt. % or less abrasive). Thus, the composition can comprise an amount of abrasive bounded by any two of the above endpoints. For example, the composition can comprise about 30 wt. % to about 90 wt. % (e.g., about 35 wt. % to about 50 wt. %, or about 30 wt. % to about 60 wt. %) abrasive.

The composition can further comprise a salt. For example, the salt can be calcium chloride, ammonium sulfate, aluminum nitrate, or combinations thereof. The composition can comprise about 1 wt. % or more (e.g., about 5 wt. % or more, or about 10 wt. % or more) of the salt. Alternatively, or in addition, the composition can comprise about 20 wt. % or less (e.g., about 10 wt. %, or about 5 wt. % or less) of the salt. Thus, the composition can comprise an amount of the salt bounded by any two of the above endpoints. For example, the composition can comprise about 1 wt. % to about 20 wt. % (e.g., about 1 wt. % to about 15 wt. %, or about 5 wt. % to about 20 wt. %) of the salt.

The composition also may comprise an oxidizing agent, which can be any suitable oxidizing agent for one or more materials of the substrate to be sliced with the wire saw and composition. For example, the oxidizing agent can be a peroxy compound or a halogen containing oxidizer. Typically, the oxidizing agent is selected from the group consisting of hydrogen peroxide, percarbonate, bleach, chlorine, perbromate, ozone, and combinations thereof. Preferably, the oxidizing agent is hydrogen peroxide. The oxidizing agent can be present in the composition in any suitable amount. The composition can comprise about 0.005 wt. % or more (e.g., about 0.01 wt. % or more, about 0.05 wt. % or more, about 0.1 wt. % or more, about 0.5 wt. % or more, about 1 wt. % or more, or about 5 wt. % or more) oxidizing agent. Alternatively, or in addition, the composition can comprise about 20 wt. % or less (e.g., about 10 wt. % or less, about 5 wt. % or less, about 3 wt. % or less, about 1 wt. % or less, or about 0.5 wt. % or less) oxidizing agent. Thus, the composition can comprise an amount of oxidizing agent bounded by any two of the above endpoints. For example, the composition can comprise about 0.005 wt. % to about 10 wt. % (e.g., about 0.01 wt. % to about 10 wt. %, about 0.01 wt. % to about 5 wt. %, about 0.1 wt. % to about 3 wt. %, or about 1 wt. % to about 5 wt. %) oxidizing agent.

The composition also may comprise an oxidation facilitator, which can be any suitable compound that increases the effectiveness of the oxidizer. For example, the oxidation facilitator can be a catalyst that lowers the activation energy of the oxidation by the oxidizing agent of one or more materials of the substrate to be sliced with the wire saw and composition. For example, the oxidation facilitator can be a metal, an organic molecule, or a radical. Typically, the oxidation facilitator is selected from the group consisting of copper, platinum, ruthenium, rhodium, quinones, 2,2,6,6-tetramethyl-piperidin-1-oxyl, and combinations thereof. The metals can be elemental or ionic in form. The oxidation facilitator can be present in the composition in any suitable amount. The composition can comprise about 0.01 wt. % or more (e.g., about 0.1 wt. % or more, about 0.5 wt. % or more, about 1 wt. % or more, about 3 wt. % or more, or about 5 wt. % or more) oxidation facilitator. Alternatively, or in addition, the composition can comprise about 20 wt. % or less (e.g., about 10 wt. % or less, about 5 wt. % or less, about 3 wt. % or less, or about 1 wt. % or less) oxidation facilitator. Thus, the composition can comprise an amount of oxidation facilitator bounded by any two of the above endpoints. For example, the composition can comprise about 0.05 wt. % to about 20 wt. % (e.g., about 0.1 wt. % to about 10 wt. %, about 0.1 wt. % to about 5 wt. %, about 0.1 wt. % to about 3 wt. %, or about 0.1 wt. % to about 1 wt. %) oxidation facilitator.

The composition can further comprise a thickener, which can be any suitable thickener. Preferably, the thickener is a non-ionic polymer such as cellulose compounds (e.g., hydroxyethylcellulose), or poly(alkylene oxide) materials (e.g., a poly(ethylene glycol), an ethylene oxide-propylene oxide copolymer, and the like). Preferably, the thickening agent has a number average molecular weight of greater than about 20,000 Daltons (Da), more preferably at least about 50,000 Da (e.g., about 50,000 to about 150,000 Da), since lower molecular weight materials tend to be less efficient as thickeners. The thickener can be present in the composition in any suitable amount. The composition can comprise about 0.05 wt. % or more (e.g., about 0.1 wt. % or more, about 0.5 wt. % or more, about 1 wt. % or more, or about 51 wt. % or more) thickener. Alternatively, or in addition, the composition can comprise about 30 wt. % or less (e.g., about 20 wt. % or less, about 10 wt. % or less, about 5 wt. % or less, or about 1 wt. % or less) thickener. Thus, the composition can comprise an amount of thickener bounded by any two of the above endpoints. For example, the composition can comprise about 0.05 wt. % to about 20 wt. % (e.g., about 0.5 wt. % to about 20 wt. %, about 0.2 wt. % to about 10 wt. %, about 0.5 wt. % to about 5 wt. %, or about 1 wt. % to about 5 wt. %) thickener.

The composition can further comprise an anti drying agent, which can be any suitable anti-drying agent. Without limitation, the anti-drying agent can be an alkynol amine or a polyacrylate. Preferred antidrying agents are triethanol amine and sodium polyacrylate. The anti-drying agent can be present in the composition in any suitable amount. The composition can comprise about 0.05 wt. % or more (e.g., about 0.1 wt. % or more, about 0.5 wt. % or more, about 1 wt. % or more, or about 20 wt. % or more) anti-drying agent. Alternatively, or in addition, the composition can comprise about 30 wt. % or less (e.g., about 20 wt. % or less, about 10 wt. % or less, about 5 wt. % or less, or about 1 wt. % or less) anti-drying agent. Thus, the composition can comprise an amount of anti-drying agent bounded by any two of the above endpoints. For example, the composition can comprise about 0.05 wt. % to about 20 wt. % (e.g., about 0.5 wt. % to about 20 wt. %, about 0.2 wt. % to about 10 wt. %, about 0.5 wt. % to about 5 wt. %, or about 1 wt. % to about 5 wt. %) anti-drying agent. Preferably, the anti-drying agent is present in the composition between about 0.5 wt. % and about 20 wt. %.

The composition can have any suitable viscosity. The viscosity of the composition can be at least about 20 cp (e.g., at least about 40 cp, at least about 60 cp, at least about 80 cp, at least about 100 cp, at least about 130 cp, or at least about 150 cp). Alternatively, or in addition, the viscosity of the composition can be about 500 cp or less (e.g., about 400 cp or less, about 350 cp or less, about 300 cp or less, about 200 cp or less, about 175 cp or less, or about 150 cp or less). Thus, the composition can have a viscosity bounded by any two of the above endpoints. For example, the viscosity of the composition can be about 20 cp to about 500 cp (e.g., about 60 cp to about 400 cp, about 100 cp to about 400 cp, about 150 cp to about 400 cp, about 150 cp to about 350 cp, about 170 cp to about 320 cp, or about 200 cp to about 300 cp).

The composition can have any suitable pH. The composition can have a pH of about 10 or less (e.g., about 8 or less). Alternatively, or in addition, the composition can have a pH of about 3 or more (e.g., about 5 or more). Thus, the composition can have a pH bounded by any two of the above endpoints. For example, the composition can have a pH of about 3 to about 10 (e.g., about 5 to about 8).

The abrasive desirably is suspended in the composition, more specifically in the liquid carrier of the composition. When the abrasive is suspended in the composition, the abrasive preferably is colloidally stable. The term colloid refers to the suspension of the abrasive particles in the liquid carrier. Colloidal stability refers to the maintenance of that suspension over time. In the context of this invention, an abrasive is considered colloidally stable if, when a suspension of the abrasive in a liquid carrier is placed into a 100 ml graduated cylinder and allowed to stand unagitated for a time of 2 hours, the difference between the concentration of particles in the bottom 50 ml of the graduated cylinder ($[B]$ in terms of g/ml) and the concentration of particles in the top 50 ml of the graduated cylinder ($[T]$ in terms of g/ml) divided by the initial concentration of particles in the composition ($[C]$ in terms of g/ml) is less than or equal to 0.5 (i.e., $\{[B]-[T]\}/[C] \leq 0.5$). The value of $[B]-[T]/[C]$ desirably is less than or equal to 0.3, and preferably is less than or equal to 0.1.

The composition can comprise, consist essentially of, or consist of the foregoing components, alone or in combination with one or more of the following optional components.

The composition can optionally further comprise one or more surfactants and/or rheological control agents, including coagulants (e.g., polymeric rheological control agents, such as, for example, urethane polymers). Suitable surfactants can include, for example, cationic surfactants, anionic surfactants, nonionic surfactants, amphoteric surfactants, mixtures thereof, and the like. Preferably, the composition comprises a nonionic surfactant. One example of a suitable nonionic surfactant is an ethylenediamine polyoxyethylene surfactant. The amount of surfactant in the composition typically is about 0.0001 wt. % to about 1 wt. % (preferably about 0.001 wt. % to about 0.1 wt. % and more preferably about 0.005 wt. % to about 0.05 wt. %).

The composition optionally further comprises one or more other additives. Such additives include acrylates comprising one or more acrylic subunits (e.g., vinyl acrylates and styrene acrylates), and polymers, copolymers, and oligomers thereof, and salts thereof.

The composition can comprise one or more antifoaming agents. The antifoaming agent can be any suitable antifoaming agent. Suitable antifoaming agents include, but are not limited to, silicon-based and acetylenic diol-based antifoaming agents. The amount of anti-foaming agent in the composition typically is about 10 ppm to about 140 ppm.

The composition can comprise one or more biocides. The biocide can be any suitable biocide, for example an isothiazolinone biocide. The amount of biocide in the composition typically is about 1 to about 50 ppm, preferably about 10 to about 20 ppm.

The composition can be prepared by any suitable technique, many of which are known to those skilled in the art. The composition can be prepared in a batch or continuous process. Generally, the composition can be prepared by combining the components thereof in any order. The term "component" as used herein includes individual ingredients (e.g., abrasive, oxidizing agent, thickener, biocide, etc.) as well as any combination of ingredients (e.g., abrasive, oxidizing agent, thickener, biocide, etc.).

The composition can be supplied as a one-package system comprising, for example, an abrasive, a liquid carrier, and optionally an oxidizing agent. Alternatively, for example, the oxidizing agent can be supplied in a first container, either in dry form, or as a solution or dispersion in the liquid carrier, and the abrasive, the liquid carrier, and other additives can be supplied in a second container. Supplying the oxidizing agent separately from the other components of the composition is preferable because it allows for the oxidizing agent to be added to the composition at any time during the slicing process. For example, the oxidizing agent can be added to the composition before the slicing process begins, during the slicing process, or after the slicing process is complete. The use of a stable oxidizing agent allows the oxidizing agent to be supplied in a container with other components of the composition, since it is less likely to react with the other components. This approach can substantially reduce the cost of preparing and using the composition.

Optional components, such as one or more biocides, can be placed in the first and/or second containers or in a third container, either in dry form, or as a solution in the liquid carrier. Moreover, it is suitable for the components in the first and second containers to have different pH values, or alternatively to have substantially similar, or even equal, pH values. If an optional component is a solid, it may be supplied either in dry form or as a mixture in the liquid carrier. The optional components can be supplied separately from the other components of the composition and can be combined, e.g., by the end-user, with the other components of the composition shortly before use (e.g., 1 week or less prior to use, 1 day or less prior to use, 1 hour or less prior to use, 10 minutes or less prior to use, or 1 minute or less prior to use). Other two-container, or three- or more-container, combinations of the components of the composition are within the knowledge of one of ordinary skill in the art.

The composition also can be provided as a concentrate which is intended to be diluted with an appropriate amount of liquid carrier prior to use. In such an embodiment, the composition concentrate can comprise abrasive, liquid carrier, and optionally oxidizing agent and/or thickener in amounts such that, upon dilution of the concentrate with an appropriate amount of liquid carrier, each component will be present in the composition in an amount within the appropriate range recited above for each component. For example, components can each be present in the concentrate in an amount that is about 2 times (e.g., about 3 times, about 4 times, or about 5 times) greater than the concentration recited above for each component in the composition so that, when the concentrate is diluted with an appropriate volume of liquid carrier (e.g., 2 equal volumes of liquid carrier, 3 equal volumes of liquid carrier, or 4 equal volumes of liquid carrier, respectively), each component will be present in the composition in an amount within the ranges set forth above for each component. Furthermore, as will be understood by those of ordinary skill in the art, the concentrate can contain an appropriate fraction of the liquid carrier present in the final composition in order to ensure that the abrasive and other suitable additives are at least partially or fully dissolved or suspended in the concentrate. Moreover, the oxidizing agent can be left out of the concentrate to be later added in an appropriate amount with liquid carrier to form the composition such that each component is present in an amount within the ranges set forth above for each component.

The invention further provides a method of slicing a substrate. The method comprises (i) contacting the substrate with a composition as described herein, (ii) contacting the substrate and the composition with a wire saw, and (iii) moving the wire saw, with the composition in contact therewith, relative to the substrate so as to abrade at least a portion of the substrate to slice the substrate.

A substrate can be sliced using the inventive composition and method with any suitable wire saw. The wire saw comprises a web of fine wires arranged using a series of spools and pulleys such that the wires are parallel. The distance between the wires can be any suitable distance, but typically is about 0.1 mm to about 1.5 mm. The diameter of the wire can be any suitable diameter, but the wire typically has a diameter of about 0.08 to about 0.2 mm. The wire portion of the wire saw can be any suitable material, but preferably comprises, consists essentially of, or consists of iron and iron alloys. A substrate is pressed against the web of wires while a composition is continuously supplied to the area. The wire saw is moved relative to the substrate, and the abrasive suspended in the composition adheres to the wire saw and facilitates the interaction between the wire of the wire saw and the substrate, so as to abrade at least a portion of the substrate and slice it into wafers.

The following example further illustrates the invention but, of course, should not be construed as in any way limiting its scope.

EXAMPLE

This example demonstrates the effects of various components on the moisture retention, cleanability, and settling properties of compositions.

A composition was prepared that contained 50 wt. % silicon carbide, 4 wt. % hydroxyethyl cellulose, and 46 wt. % water. The composition was divided into eighteen different compositions (Compositions A-R) to which varying types and amounts of alcohols and/or salts were added as set forth in Table 1.

Each of the compositions was evaluated using the settling test (7 days), drop spatula test (7 days), the scratch test and the ultrasonic (40 sec.) test. The drop spatula and the settling tests were performed in order to test the suspendability of the slurry and how easy it will re-disperse after settling. The scratch and the ultrasonic tests were performed in order to examine the cleanability and the drying-ability of the slurry.

The drop spatula test was conducted by dropping a spatula into a graduated cylinder that contained the slurry being tested. The slurry had been allowed to settle in the cylinder for 7 days prior to testing. In this test, the spatula will drop down to the bottom of the cylinder if there is no hard settling. A visual analysis was done to determine whether or not the spatula touched the bottom of the cylinder, and an estimate of where in the cylinder the spatula had settled. A large layer of hard-settled abrasive is indicative of problems with re-dispersing after settling.

The settling test was conducted by visually observing the clear liquid layer in a slurry that had been allowed to settle for 7 days in a graduated cylinder. The higher the number the more settled the slurry is. The scratch was conducted by placing an aliquot of the slurry on a glass slide and then drying. After 24 hours, a cotton swab was used to wipe away the dried slurry. The slurry drying is measured qualitatively by how easy it is to be wiped out. The ultrasonic test was then measured on the same glass slide from the dried slurry test. After 40 seconds of sonication, the glass slide was examined for any remaining slurry. Easy to clean slurry will be cleaned off the glass slide after sonication. The results are summarized in Table 1.

TABLE 1

| Composition | Alcohol/Salt | Drop Spatula, 7 days | Scratch test | Ultrasonic, 40 sec. | Settling Test |
|---|---|---|---|---|---|
| A (inventive) | 1% glycerol | No | no | yes | 7.3 |
| B (inventive) | 5% PEG | Yes | yes | yes | 7.5 |
| C (inventive) | 5% glycerol | halfway | yes | yes | 7.5 |
| D (inventive) | 1% PPG | No | yes | yes | 7.2 |
| E (inventive) | 1% hexyl alcohol | Yes | yes | yes | 7.8 |

TABLE 1-continued

| Composition | Alcohol/Salt | Drop Spatula, 7 days | Scratch test | Ultrasonic, 40 sec. | Settling Test |
|---|---|---|---|---|---|
| F (inventive) | 5% hexyl alcohol | Yes | yes | yes | 6.7 |
| G (inventive) | 1% PEG | Yes | no | yes | 8 |
| H (inventive) | 5% PPG | No | no | no | 7.3 |
| I (comparative) | None | No | no | no | 8 |
| J (inventive) | PEG 300 | Yes | yes | yes | 6.5 |
| K (inventive) | 5% CaCl$_2$ | Yes | no | no | 7.4 |
| L (inventive) | 1% CaCl$_2$ | Yes | no | no | 7.6 |
| M (inventive) | 1% hexyl alcohol | Yes | yes | yes | 7.7 |
| N (inventive) | 7% PEG | Yes | yes | yes | 7.2 |
| O (inventive) | 1% CaCl$_2$, 7% PEG | ¾ down | yes | yes | 7.4 |
| P (inventive) | 5% ammonium sulfate | No | yes | no | 7.2 |
| Q (inventive) | 1% ammonium sulfate | No | yes | yes | 7.1 |
| R (comparative) | None | No | no | no | 8 |

As is apparent from the results set forth in Table 1, Compositions containing polyol such as glycerol, polyethylene glycol (PEG), polypropylene glycol (PPG) and monatomic alcohol such as 1-hexanol (hexyl alcohol) as well as salts such as calcium chloride and ammonium sulfate show better cleanability and less drying of the slurry.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of slicing a substrate, which method comprises:
   (i) contacting the substrate with a composition comprising:
      (a) a liquid carrier comprising at least about 50 wt. % water and about 0.1 wt. % to about 20 wt. % of a polyol, based on the weight of the liquid carrier;
      (b) about 30 wt. % to about 60 wt. % of an abrasive suspended in the liquid carrier; and
      (c) about 0.2 wt. % to about 10 wt. % of a thickener, wherein the thickener is a cellulose compound;
   (ii) contacting the substrate and the composition with a wire saw, and
   (iii) moving the wire saw, with the composition in contact therewith, relative to the substrate so as to abrade at least a portion of the substrate to slice the substrate.

2. The method of claim 1, wherein the polyol is glycerol, polyethylene glycol, 1,6-hexanediol, pentaerythrite, or a combination thereof.

3. The method of claim 1, wherein the polyol has a carbon chain of four or more carbons.

4. The method of claim 1, wherein the polyol has a carbon atom to oxygen atom ratio of at least about 2.5:1.

5. The method of claim 1, wherein the composition further comprises an oxidizing agent.

6. The method of claim 1, wherein the composition further comprises calcium chloride, ammonium sulfate, aluminum nitrate, or combinations thereof.

* * * * *